Feb. 20, 1968 — T. A. ARMAO — 3,369,550
CRYOGENIC CLAMPS
Original Filed Dec. 2, 1963 — 6 Sheets-Sheet 1
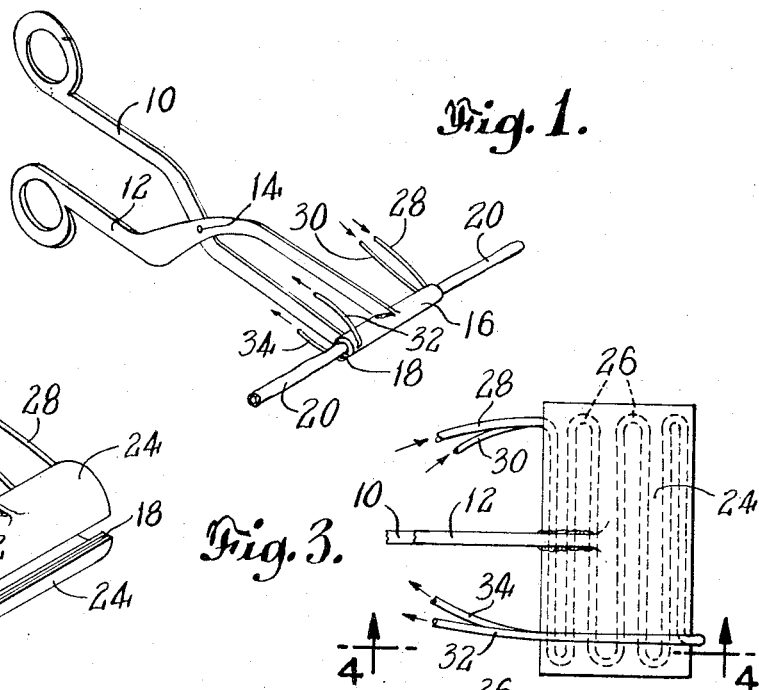
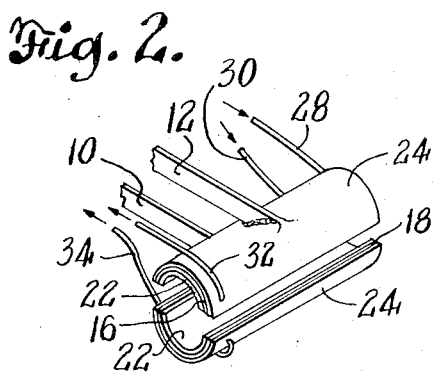
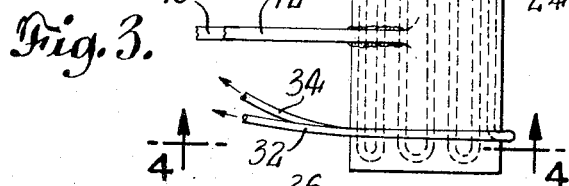
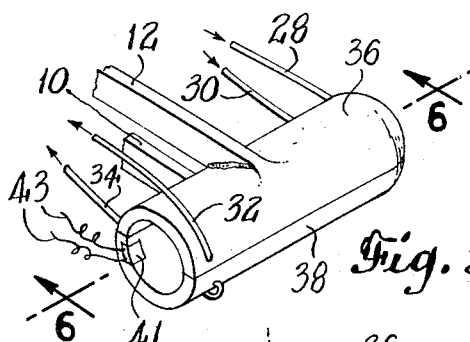
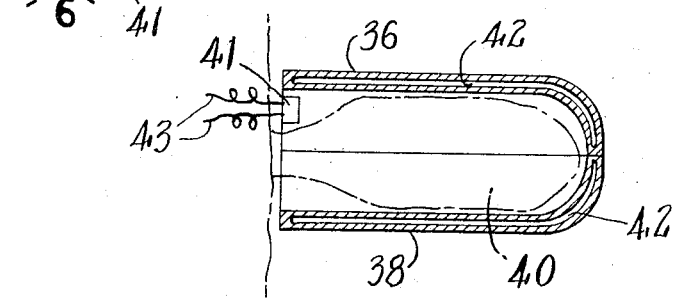
INVENTOR.
THOMAS A. ARMAO
BY
J. Hart Evans
ATTORNEY Feb. 20, 1968     T. A. ARMAO     3,369,550
CRYOGENIC CLAMPS Original Filed Dec. 2, 1963     6 Sheets-Sheet 2

INVENTOR.
THOMAS A. ARMAO
BY
J. Hart Evans
ATTORNEY

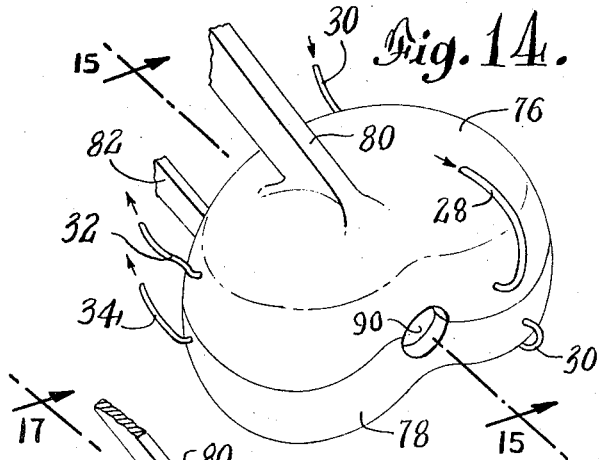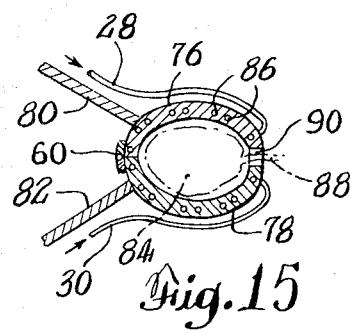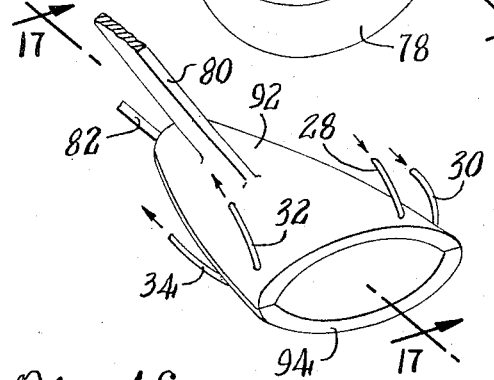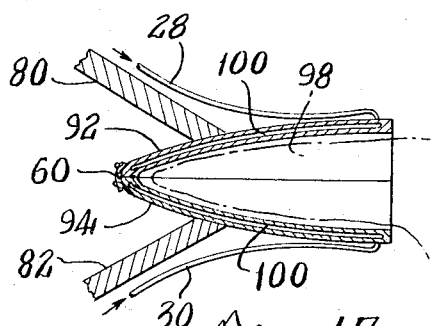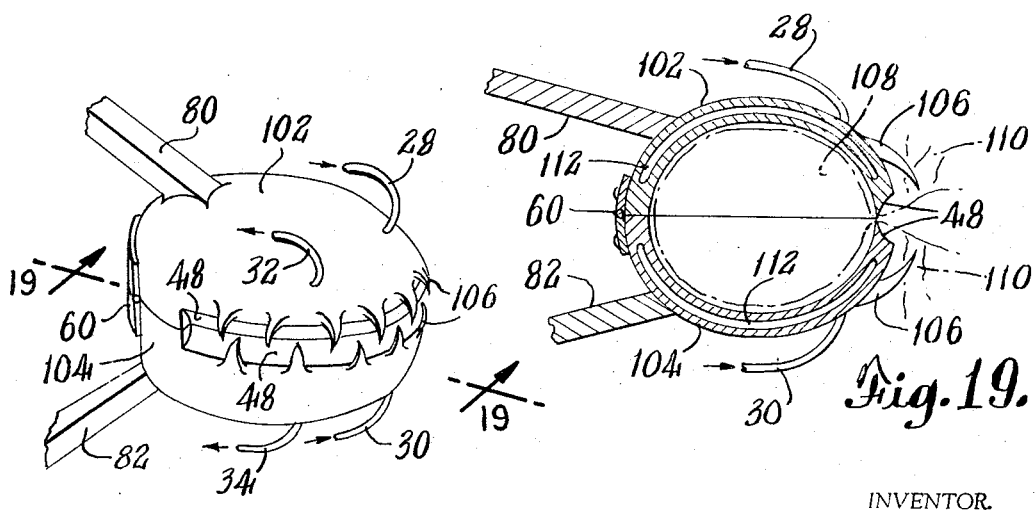

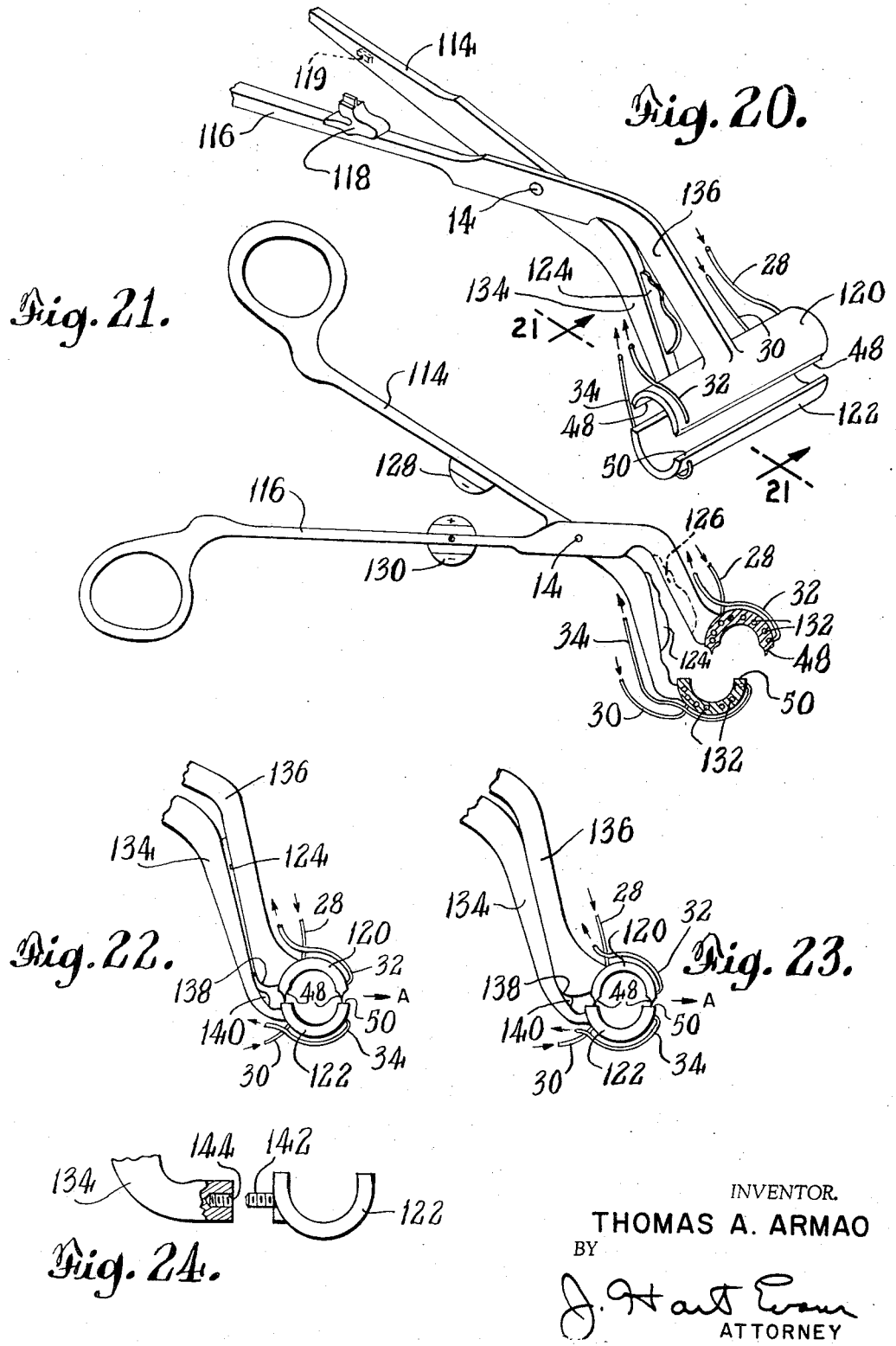

INVENTOR.
THOMAS A. ARMAO

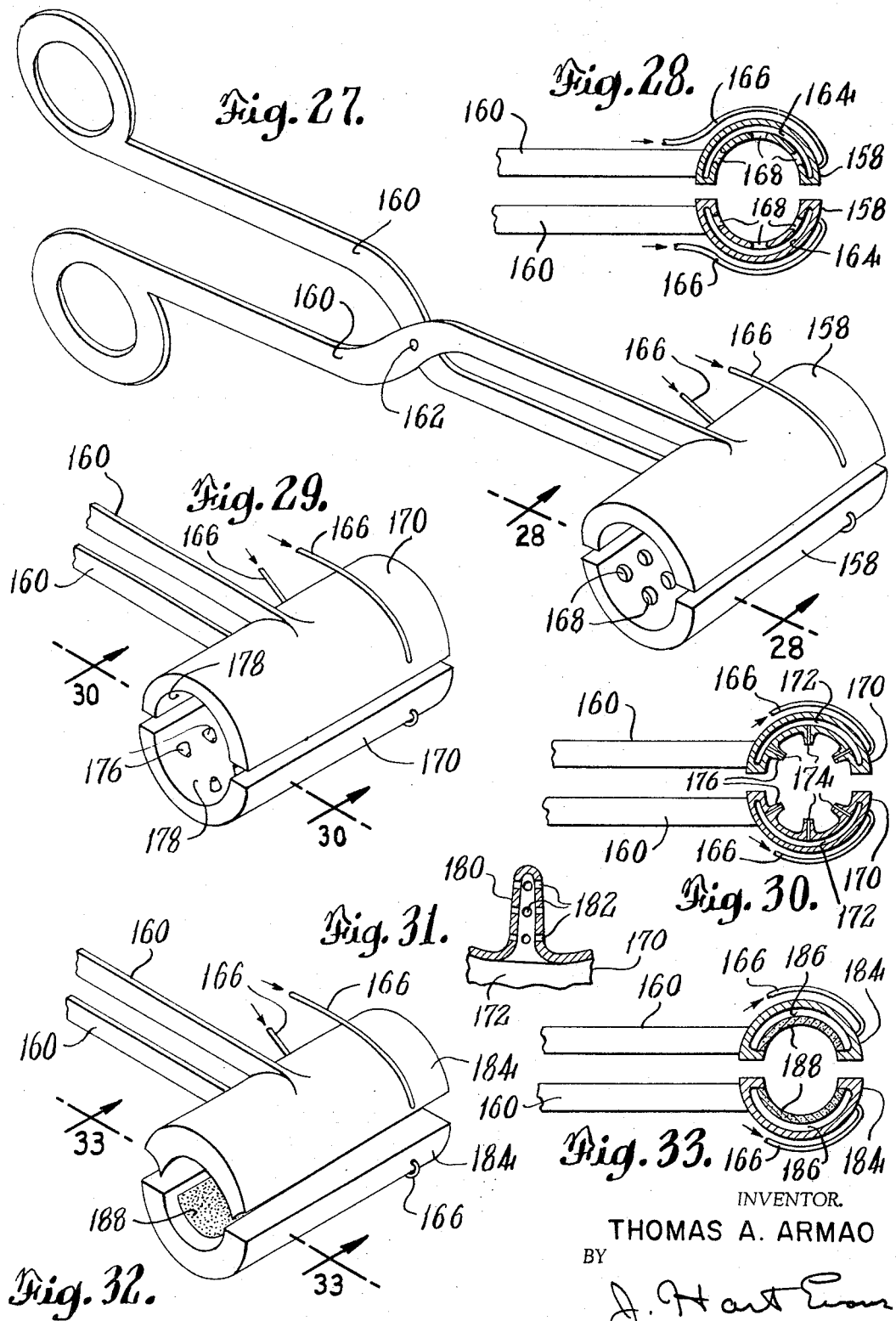

United States Patent Office 3,369,550
Patented Feb. 20, 1968

3,369,550
CRYOGENIC CLAMPS
Thomas A. Armao, 1 78th St., Brooklyn, N.Y. 11209
Continuation of application Ser. No. 328,447, Dec. 2, 1963, which is a continuation-in-part of applications Ser. No. 242,019, Dec. 3, 1962, and Ser. No. 134,733, Aug. 29, 1961. This application Feb. 17, 1967, Ser. No. 616,987
9 Claims. (Cl. 128—303.1)

This invention relates to a cryogenic instrument for use in surgery. It is a continuation of my abandoned application Ser. No. 328,447 which is a continuation-in-part of my copending application Ser. No. 242,019, now Patent No. 3,228,400 filed Dec. 3, 1962, and is also a continuation-in-part of my copending application Ser. No. 134,733 now abandoned filed Aug. 29, 1961, of which Serial No. 242,019 is also a continuation-in-part. More particularly this invention relates to a cryogenic clamp suitable for encompassing viable tissue in a human or animal body. The clamp has integral means for cooling the interior surface of the clamp to any desired degree.

In the surgical treatment of diseases of the colon or large intestine, particularly cancers thereof, it is frequently necessary to dissect out and remove a portion of the colon. This dissection can result in the metastasis or release of malignant cells into healthy tissue. In order to prevent this dissemination of cancer cells during surgery the colon is ligated or tied off on either side of the segment to be removed. The arteries, veins and lymphatics supplying and draining the tied off malignant section are similarly tied off, all for the purpose of preventing the spillage and migration of malignant cells directly into healthy portions of the colon, or through the veins and lymphatics to other parts of the body.

The ligation or blocking of the colon and the vascular and lymphatic systems supplying and draining the portions of the colon to be resected has conventionally been accomplished mechanically with tape or gut or with clips of metal or plastic. These methods have the disadvantage of inevitably involving physical manipulation of the organ and regional tissues and vessels, which manipulation has the effect of furthering the spread of the malignant cells by "massaging" them into healthy tissue. It has been discovered however that satisfactory blocking of body organs or areas of the anatomy, including those in a malignant state, can be achieved by cooling circumferentially around them. This cooling technique, unlike mechanical blocking or ligation, gives no opportunity for the mechanical propulsion into healthy tissue of the malignant cells which are ever present in the tissue and lumens of the veins and lymphatics surrounding and draining the malignant area.

In the use of the cooling technique, if the area of the colon to be resected is relatively small the entire colon segment can be circumferentially cooled or frozen. If a large section is to be removed circumferential cooling can be applied around the colon on both sides of the section being resected, thereby preventing the dissemination of malignant cells beyond the area of resection into healthy portions of the colon. Similar circumferential cooling is applied around the arteries, veins and lymphatics supplying and draining the area of the resection. This prevents the spread of malignant cells via the venuous and lymphatic routes to other tissues and parts of the body. After the cooling or freezing is effected the colon is severed distal to the cooled areas. The arteries, veins and lymphatics are ligated distal to the cooled or frozen portions of them and are then cut between the tie suture and the cooled or frozen area. In this manner the entire diseased section of the colon with the attached vessels can be resected and lifted free of the body as a unit.

Cooling is a particularly effective way of preventing the metastasis or release of malignant cells into healthy tissue during dissection. Cooling of a diseased segment of tissue causes stasis of the area, thereby rendering the malignant cells immobile by inhibiting the activity and movement of fluids in the tissue, and thus prevents spread of the malignancy. While cooling to a degree of stasis is ordinarily sufficient it is possible to actually freeze the afflicted tissue to a temperature well below zero degrees centigrade, thereby rendering it harmless for a prolonged period of time. Freezing at sufficiently low temperatures will destroy cancer cells but it is doubtful whether it can destroy cancer viruses if such exist within a cell. It does however render the tissue hard and immobile and reduce to an absolute minimum the danger of spillage of malignant cells into healthy tissue.

Blocking of organs such as the colon and of arteries, veins and lymphatics by cooling rather than by mechanical means is also quite advantageous and desirable in the application of the perfusion technique of drug injection, whether the perfusion is done alone or in combination with surgery. When perfusion is combined with surgery an antineoplastic drug is injected in the proximity of the malignancy. These drugs destroy malignant cells that have been shed by the tumor and are lodged in the tissues and lumens of the veins and lymphatics that surround and drain the area of the malignancy. When perfusion is combined with surgery in the treatment of cancer of the colon, circumferential cooling is applied to either side of the colon segment to be removed. This cooling serves a dual purpose in that it not only blocks the migration of malignant cells into healthy portions of the colon but also seals off the isolated section to contain the drugs. An antineoplastic drug is injected into the lumen of the blocked off segment of the colon a half hour prior to the surgical resection. There the drug is absorbed and diffuses through the vessels and tissues surrounding and draining the diseased segment of the colon, destroying malignant cells presurgically lodged in these vessels and tissues. The drug, which has saturated the area surrounding the malignancy, destroys cells which break away during the surgical manipulation and resection of the malignancy.

In certain cases where surgery cannot be performed or is not desirable, perfusion of the malignant area with an antineoplastic drug may alone be employed. Whether done alone or in combination with surgery it is important that the diffusion of the antineoplastic drug within the body be controlled, lest systemic toxicity occur. Antineoplastic drugs do not have specific pharmacological cytotoxicity and will attack normal immature cells as well as malignant cells. The resulting toxicity, if these drugs are not used properly, will lead to a depletion of bone marrow and other serious problems. The cooling or freezing technique can provide the total blockage required to hold the drug in loco for a protracted period of time. After the drug has been contained for the required period of time it is desirable to let it diffuse slowly out of the perfusion area into the general circulation. Such slow diffusion can readily be achieved by gradually decreasing the degree of cooling applied around the area containing the drug. Like perfusion, extreme cold can be employed to totally destroy malignant cells, such as malignant melanoma, either alone or in combination with surgery. While it is questionable whether cancer viruses, if present, will be killed, malignant cells can be totally destroyed. Depending on the situation the cells destroyed by freezing may be surgically removed or may be left to be disposed of by normal body processes.

Peripheral cooling of veins, arteries and lymphatic vessels to control the flow of blood and lymph therethrough is useful not only in the resection of malignancies but in other surgical procedures as well, for example cardiovascular surgery. Control of the rate of flow of blood is of critical importance in this type of surgery. With circumferential cooling of the blood vessel any desired degree of stasis of the vessel and its contents can be achieved. Freezing below the stasis value can supply the total blockage or destruction sometimes required, as in the treatment of an aneurysm or blood vessel tumor. The stasis which results from cooling a vein, artery or lymphatic vessel inhibits the activity and movement of fluids and cells contained therein, without damage to the vessel or its contents and this stasis is reversible upon permitting the vessel to return to normal temperature. Cooling below the stasis value, however, may cause permanent damage to the vessel and its cellular fluid contents. Cooling and freezing can be useful not only with intestines, blood vessels and the like, but with many organs of the body as well, such as the appendix, stomach, testicles, ovaries, kidneys, tonsils and tongue, among others. Peripheral cooling around a nerve trunk can be used to block nerve conductivity. Extremely low temperatures can be employed to sever or destroy nerves. Peripheral cooling of outer portions of the body such as an arm or leg may be used to control circulation in those members as desired.

My invention comprises a cryogenic clamp which is secured around a blood vessel, body organ, body part or the like. As used herein to describe my invention the term "clamp" does not imply that my instruments necessarily apply pressure to the body portions they encompass. My clamp encloses a portion of viable tissue, but does not necessarily compress it; in many applications a lack of appreciable pressure is most desirable. The clamp of the invention has integral cooling means capable of cooling the interior surface of the clamp head. This cooling may be achieved by circulating a cooling fluid within the clamp head, by means of attached thermoelectric modules or by any other suitable means. The shape of the clamp will vary widely depending upon the portion of the body which it is to enclose. For certain purposes integral cutting edges may facilitate its use. In one embodiment of my invention the clamp is designed to let cooling fluid impinge directly upon tissue. This can be accomplished through holes or openings in the interior surface of the clamp, through perforated protrusions on the inner surface or through a porous inner surface.

In the drawings:

FIGURE 1 is a view of a clamp closed around a blood vessel.

FIGURE 2 is a view of the head of the clamp of FIGURE 1 in the open position.

FIGURE 3 is a top view of the head of the clamp shown in FIGURE 1, with the interior cooling conduits shown in dotted lines.

FIGURE 4 is a sectional view of FIGURE 3.

FIGURE 5 is a view of a clamp head similar to the clamp head of FIGURE 2, but closed at one end.

FIGURE 6 is a sectional view of the closed end clamp of FIGURE 5, showing it in position over a body organ such as the appendix.

FIGURE 14 is a view of a clamp suitable for encasing a human organ such as a kidney.

FIGURE 15 is a sectional view of the clamp of FIGURE 14.

FIGURE 16 is a view of a clamp suitable for encasing a portion of a body organ, particularly a protruding organ such as the tongue.

FIGURE 17 is a sectional view of the clamp of FIGURE 16.

FIGURE 18 is a view of a clamp similar to that of FIGURE 14 and having a cutting edge on part of its edge and having teeth for engaging tissue, the shape of the clamp being suitable for encasing a body organ such as a tonsil.

FIGURE 19 is a sectional view of the clamp of FIGURE 18.

FIGURE 20 is a view of a clamp with a head having cutting edges on one edge of each pair of opposed mating edges, the clamp being designed to cause the edges to slide so as to cut more cleanly when the clamp head is closed.

FIGURE 21 is a sectional view of the clamp head of the clamp of FIGURE 20, with magnets shown in the unsectioned clamp handles.

FIGURE 22 is an end view of the clamp head of FIGURE 20 with the mating cutting edges only slightly apart from one another.

FIGURE 23 is an end view of the clamp head of FIGURE 20 in the fully closed position.

FIGURE 24 is an enlarged partial section of one half of a clamp head which is removably attached to a clamp handle.

FIGURE 27 is a view of a clamp head similar to that of FIGURE 2 but having openings on its inner surface.

FIGURE 28 is a sectional view of the clamp head of FIGURE 27.

FIGURE 29 is a view of a clamp head similar to that of FIGURE 27 but having perforated protrusions on its inner surface.

FIGURE 30 is a sectional view of the clamp head of FIGURE 29.

FIGURE 31 is a detail view of a perforated protrusion somewhat different from those shown in FIGURES 29 and 30.

FIGURE 32 is a view of a clamp head similar to that of FIGURE 27 but having a porous inner surface.

FIGURE 33 is a sectional view of the clamp head of FIGURE 32.

Figure 7:
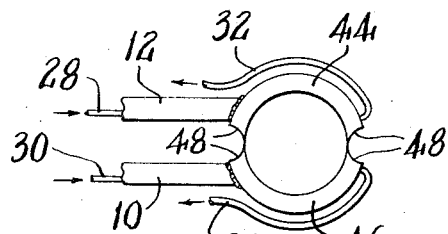
FIGURE 7 is an end view of a clamp head similar to that of FIGURE 2 but having cutting edges on all four opposed mating edges.

In an instrument according to the invention as shown in FIGURES 1 and 2 a pair of elongated clamp portion manipulating members 10 and 12 are articulated to each other by a hinge 14. Attached to the end of the member 12 is an upper clamp head or portion 16 in the shape of half a hollow cylinder which, when the clamp is closed, cooperated with the lower clamp head or portion 18 attached to the element 10 to form a complete hollow cylinder. In FIGURE 1 the clamp is shown closed around a blood vessel 20. If desired the interior surfaces of the clamp heads 16 and 18 may be lined with a soft resilient material 22, which however should not be an insulator. For many uses it is desirable to cover the outside of the clamp heads 16 and 18 with an insulating material 24 to prevent damage to surrounding tissue.

As can be seen in FIGURES 3 and 4 the clamp heads 16 and 18 contain unbranched interior ducts or conduits 26 which are coiled so as to provide a continuous duct through each clamp head. Connected to the ducts 26 are inlet tubes 28 or 30 at one end of the duct 26 and exhaust 32 or 34 at the other, whereby cooling fluid can be passed through the clamp heads 16 and 18, substantially uniformly cooling at least the inner surfaces of the clamp heads.

In FIGURE 5 is shown a pair of clamp heads 36 and 38, similar in shape to clamp heads 16 and 18, but closed at one end by half hemispheres so that the closed clamp is suitable for enclosing an appendage such as an appendix 40 as illustrated in FIGURE 6. Interior ducts 42 cool the clamp heads 36 and 38, being supplied with cooling fluid through inlet tubes 28 and 30 and exhausted through exhaust tubes 32 and 34. An optional thermocouple 41 is connected by wires 43 to a remote temperature recorder.

Figure 8:
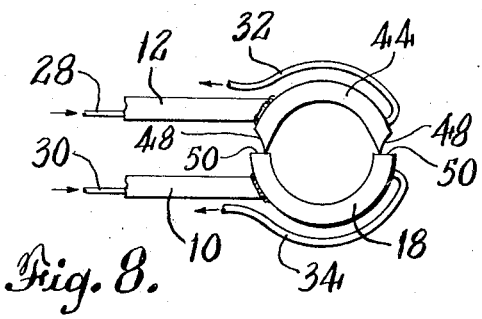
FIGURE 8 is an end view of a clamp head similar to that of FIGURE 2 but having cutting edges on one edge of each pair of opposed mating edges.

FIGURE 7 is an end view of clamp heads 44 and 46, each of which has a cutting edge 48 along both edges which mate with opposing edges. FIGURE 8 is an end view of clamp heads wherein only the upper clamp head 44 has two cutting edges 48 and the lower clamp head 18 has flat surfaced edges 50 which meet the opposing cutting edges 48. Inlet tubes 28 and 30 supply cooling fluid to the cooling heads 44, 46 and 18 while exhaust tubes 32 and 34 remove the fluid from said heads.

Figure 9:
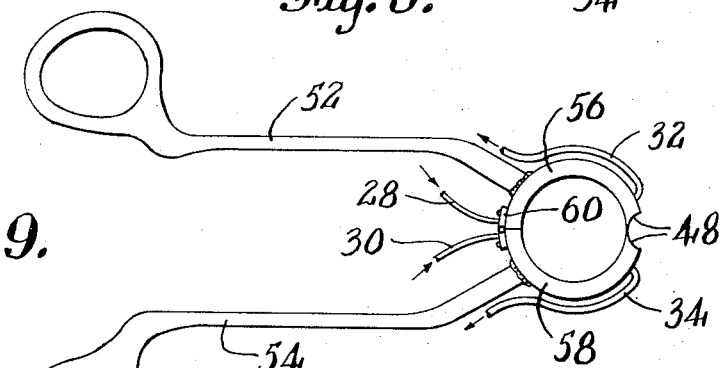
FIGURE 9 is an end view of a clamp having a hinged head and having cutting edges on both edges of the unhinged pair of opposed mating edges.
Figure 10:
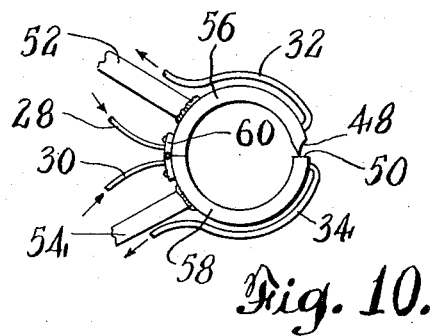
FIGURE 10 is an end view of a clamp head similar to that of FIGURE 9 but having a cutting edge on only one edge of the unhinged pair of opposed mating edges.

FIGURE 9 is an end view of a tubular clamp wherein elongated members 52 and 54 are connected respectively to upper clamp head 56 and lower clamp head 58, which clamp heads are joined by a hinge 60. Inlet tubes 28 and 30 supply cooling fluid to the clamp heads 56 and 58 respectively, while exhaust tubes 32 and 34 remove it. The opposed mating edges on the clamp head sides which do not have the hinge 60 have cutting edges 48. FIGURE 10 is an end view of a tubular clamp quite similar to that of FIGURE 9 except that only one of the opposed mating edges on the clamp side not having the hinge 60 has a cutting edge 48.

Figure 11:
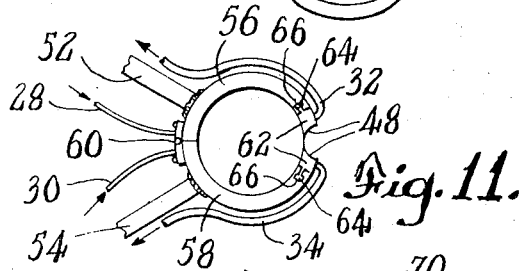
FIGURE 11 is an end view of a clamp head similar to that of FIGURE 9 but having replaceable cutting edges.
Figure 12:
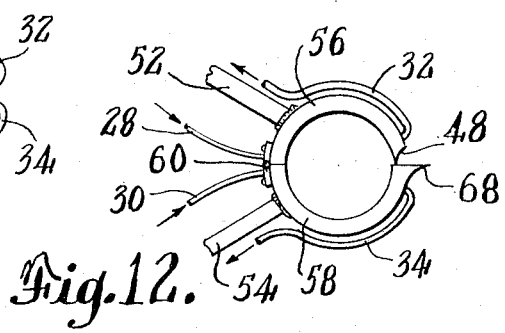
FIGURE 12 is an end view of a clamp head similar to that of FIGURE 10 but having a lateral cutting edge.

FIGURE 11 is an end view of a tubular clamp similar to that of FIGURE 10 except that the cutting edges 48 are on blade segments 62 which are removably attached to the clamp heads 56 and 58 by a T-shaped tongue 64 fitted into a similarly shaped groove 66 in the clamp heads 56 and 58. The tubular clamp of FIGURE 12 is similar to that of FIGURE 10 except that in addition to the vertical cutting edge 48 on the upper clamp head 56 there is a lateral cutting edge 68 on the lower clamp head 58. In the clamps of FIGURES 11 and 12 inlet tubes 28 and 30 supply cooling fluid to the clamp heads 56 and 58 and exhaust tubes 32 and 34 remove it.

Figure 13:
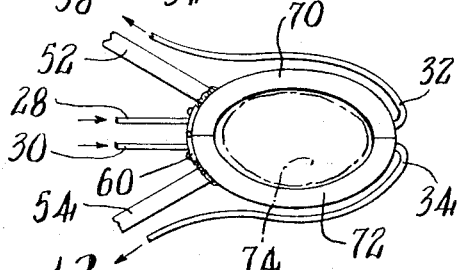
FIGURE 13 is an end view of a clamp head similar to that of FIGURE 9 but having no cutting edges and of a size and interior contour such as to fit around a human body member such as an arm or a leg.

FIGURE 13 is an end view of a clamp generally similar to that of FIGURE 9 but differing in that it does not have any cutting edges and is not circular in cross section. Clamp heads 70 and 72 have interior surfaces shaped and contoured to fit around a human body member such as an arm 74. Inlet tubes 28 and 30 supply cooling fluid to the clamp heads 70 and 72 and exhaust tubes 32 and 34 remove it.

In FIGURES 14 and 15 is shown a cryogenic clamp which is specially shaped to enclose a kidney 84. An upper clamp head 76 is attached to a handle 80 and a lower clamp head 78 is attached to a handle 82, the clamp heads being joined by a hinge 60. Interior ducts 86 circulate cooling fluid through the clamp heads 76 and 78, said ducts 86 being supplied with cooling fluid through inlet tubes 28 and 30 and exhausted through exhaust tubes 32 and 34. When closed the clamp completely encloses the kidney 84 except for the connecting renal artery, renal vein and ureter 88 which pass through the opening 90. In FIGURE 16 and in the section view of FIGURE 17 handles 80 and 82 are attached to an upper clamp head 92 and a lower clamp head 94 which are connected by a hinge 60. The clamp is open at the end away from the hinge 60 and is so shaped as to enclose a protruding organ of the body such as a tongue 98. Interior ducts 100 circulate cooling fluid through the clamp heads 92 and 94, the interior ducts 100 being supplied with cooling fluid through inlet tubes 28 and 30 and exhausted through exhaust tubes 32 and 34.

FIGURE 18 illustrated a cryogenic clamp in which the upper clamp head 102 and the lower clamp head 104 each have cutting edges 48 around a portion of their circumference, as well as teeth 106 for engaging tissue. This clamp is shaped to be used to remove a tonsil 108 as shown in the section view of FIGURE 19. The teeth 106 engage the peripheral tissue 110 and thus facilitate removal of the tonsil 108. The clamp heads 102 and 104 are connected by a hinge 60 and have handles 80 and 82. Interior cooling ducts 112 circulate cooling fluid through the heads 102 and 104, which fluid is supplied to the ducts 112 by inlet tubes 28 and 30 and exhausted from the ducts 112 by exhaust tubes 32 and 34.

In the instrument illustrated in FIGURE 20 handle elements 114 and 116 are connected to each other by a hinge 14. An optional fulcrum 118 on handle element 116 cooperates with opposing handle element 114, preferably through a notch 19, when the instrument is nearly closed, thereby giving better control of the cutting action of the instrument. The fulcrum 118 is preferably somewhat flexible. An upper clamp head 120 with cutting edges 48 is attached to handle 116 and cooperates with lower clamp head 122 attached to handle 114. As the clamp is closed around a blood vessel or the like the cutting edges 48 cut away any fascia or connected tissue surrounding the blood vessel. A guide fin 124 assures proper mating of the two clamp heads 120 and 122 by entering the guide fin opening 126 shaped to receive it. If desired magnets 128 and 130 can be affixed to the handles 114 and 116 as shown in FIGURE 21. One of the magnets 130 can be removed to reverse the magnet poles so that the magnets can either attract or repel one another. Interior cooling ducts 132 circulate cooling fluid through the clamp heads 120 and 122, being supplied with cooling fluid through inlet tubes 28 and 30 and exhausted through exhaust tubes 32 and 34.

As can be seen from FIGURE 22, when the instrument is closed to the extent that the cutting edges 48 of the upper clamp head 120 barely meet the surfaces of the lower clamp head 122, the forward handle portions 134 and 136 are slightly separated and the upper clamp head 120 is not directly above the lower clamp head 122. Further pressure bringing together the handles 114 and 116 causes the upper forward handle portion 136 to move tight against the lower forward handle portion 134, as shown in FIGURE 23. At the same time the upper clamp head 120 moves slightly with respect to the lower clamp head 122 so that the cutting edges 48 move slightly in the direction of the arrow A as well as down. This slight forward motion, which accomplishes a better cutting away of the fasca around the blood vessel or the like, is caused by the heel 138 of the upper forward handle portion 136 moving over the hump 140 in the lower forward handle portion 134. In FIGURE 24 is shown a removable lower clamp head 122 which is attached to a forward handle portion 134 by a threaded stud 142 which screws into a threaded hole 144, thereby permitting the use of interchangeable heads on the same instrument.

Figure 25:
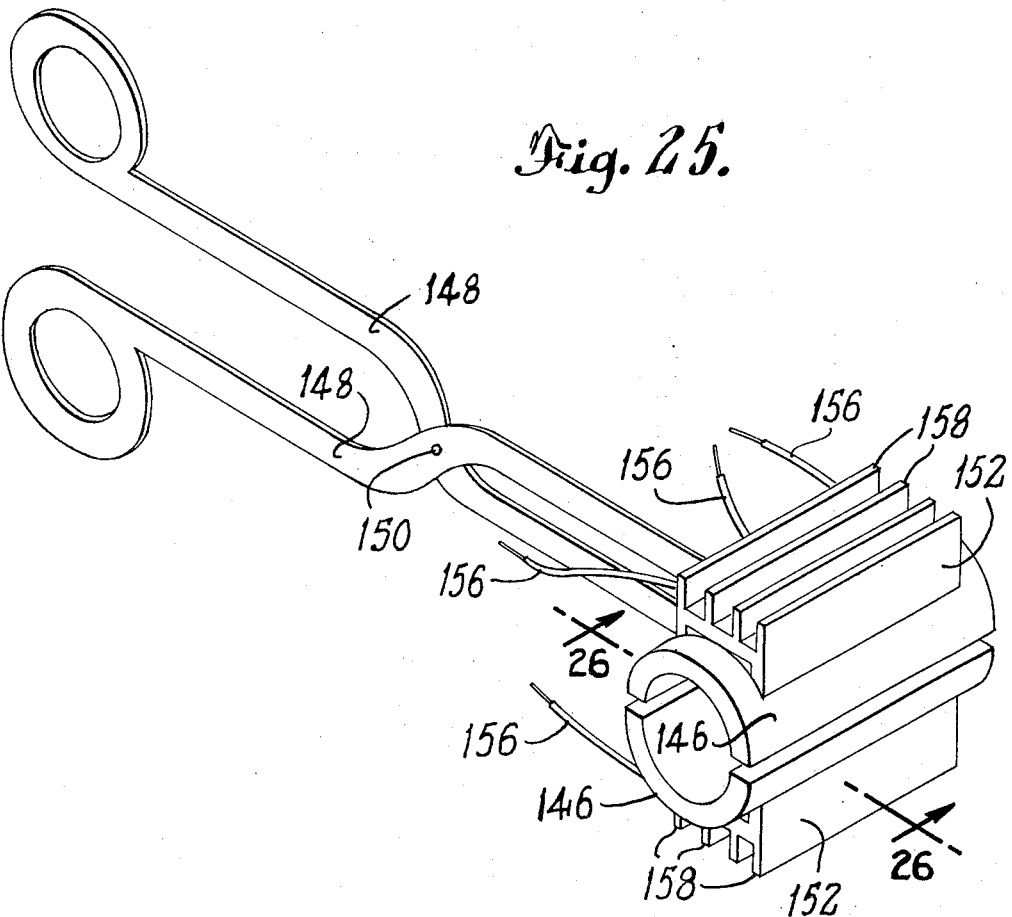
FIGURE 25 is a view of a clamp head similar to that of FIGURE 2 but having thermoelectric cooling cells attached.
Figure 26:
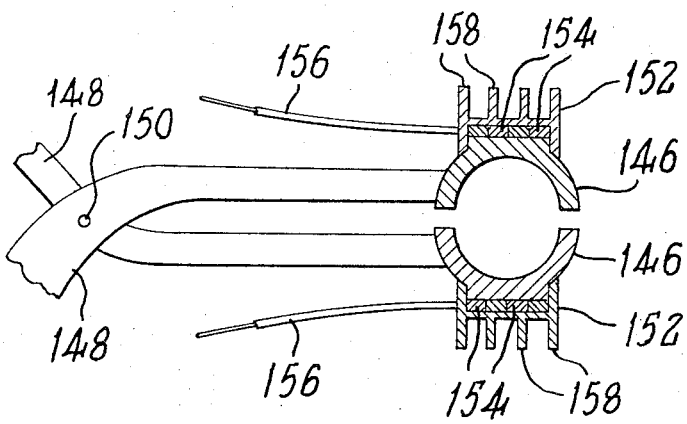
FIGURE 26 is a sectional view of the clamp head of FIGURE 25.

In FIGURES 25 and 26 is shown a pair of clamp heads 146 attached to handles 148 connected by a hinge 150 and having cooling modules 152 mounted on them. The cooling modules 152 contain a multiplicity of thermocouples 154 which are electrically in series but thermally in parallel. Wires 156 supply current to the modules 152 and cooling fins 158 dispel the heat generated.

In FIGURES 27 and 28 are shown a pair of clamp heads 158 attached to handles 160 connected by a hinge 162. Distribution channels 164 within the heads 158 are supplied with cooling fluid through inlet tubes 166. The fluid then circulates from the distribution channels 164 through the openings 168 into the interior of the clamp. The clamp in FIGURES 29 and 30 is similar to that of FIGURES 27 and 28. It has clamp heads 170 on handles 160 with distribution channels 172 supplied with cooling fluid through inlet tubes 166. The fluid then circulates from the distribution channels 172 through the openings 174 in the protrusions 176 on the interior surface walls 178 of the clamp heads 170. FIGURE 31 shows a different type of protrusion 180 with a solid end and side openings 182. FIGURES 32 and 33 illustrate a clamp similar to that shown in FIGURES 27 and 28. It has clamp heads 184 on handles 160 with distribution channels 186 supplied with cooling fluid through inlet tubes 166. The fluid then circulates from the channels 186 through the porous interior surface walls 188 into the interior of the clamp.

Although omitted from the drawing for clarity it is to be understood that the tubes 28, 30, 32, 34 and 166 are preferably covered on the outside with an insulating material such as silk, plastic or the like. They may also be contained in a second tube with a vacuum in the annular space to provide insulation. The tubes themselves can be of any suitable material such as plastic or metal. For clarity in the drawings all of the tubes have been shown running free to the clamp heads; and the wires for the thermoelectric cooling are similarly shown. Actually it will be preferable in many cases to have these tubes or wire attached to the handles supporting the clamp heads. Tubes or wires can be placed inside the handles or channels or ducts can be cut through the handles rather than separate tubes.

The interior ducts within the clamp heads can be of any suitable construction. Thus they can be channels through a solid clamp head or they can be coils within a hollow clamp head, which coils may or may not be surrounded by a heat transfer liquid. The materials for making the clamp head and for the coils can be metal or any material with satisfactory heat transfer characteristics. The insulation in the embodiment shown in FIGURE 2 can be any suitable insulating material such as ceramic, plastic or the like. As it is desirable to know the degree of cooling or freezing achieved at any particular time, a temperature sensing device such as a thermocouple can be mounted on the cooling surface of the clamp, as shown in FIGURE 5. Wires are run back from the thermocouple to a point outside the body where the temperatures can be read on an indicating and recording device. When the clamp is extremely cold there may be a tendency for the metal surfaces to stick to tissue. It may be desirable therefore to coat metal surfaces both within the clamp head and on the outside with a material such as silicon or Teflon, or to smear petroleum jelly or the like over the surface.

As is apparent from the various shapes illustrated in the drawings the shape of the clamp is not critical and can be varied as required for particular purposes. Size as well as shape of the clamp can be varied to provide a clamp capable of enclosing almost any organ of the body or any body section or portion. For many purposes the smooth edged clamp is sufficient. Frequently, however, the blood vessel or body organ to be enclosed by the clamp is surrounded by fascia or attached tissue which must be cut away in order to get the clamp into position. While this can be done with separate knives or scalpels, it is conveniently done with cutting blades or edges attached to the clamp heads as illustrated in the drawings. There is a special advantage to this arrangement in that the blades themselves can be cooled and thus serve to cauterize the tissue they cut, thereby greatly reducing the likelihood of the spread of any malignancy present.

The removable blades or cutting edges illustrated in FIGURE 11 have many advantages. They are of course easily removed for cleaning and sharpening. They also greatly increase the usefulness of a single clamp by permitting its use with different shaped cutting edges or with smooth edge inserts which convert it to a conventional clamp without cutting edges. The tonsil removing clamp of FIGURES 18 and 19 illustrates the degree to which specialized clamps can be designed within the scope of the invention. The special teeth on this clamp greatly facilitate its use in the removal of tonsils and the combination of engaging teeth, cutting edge and freezing clamp provides a complete procedure for the removal of tonsils.

In the embodiment of the invention shown in FIGURES 20 and 21 there is provided a cooling clamp with cutting edges which is particularly easy to operate. Thus it is particularly useful where access and/or vision are limited, as in many internal portions of the body. The cutting action of the cutting edges is greatly improved by the slight sliding forward action of the upper clamp head after the heads are first barely closed. The sliding cutting action insures that the clamp will fit completely around the blood vessel, organ or the like by cleanly cutting away all of the fascia or connected tissue which might interfere with the closing of the clamp heads. Proper alignment of the two opposed clamp heads is aided by the preferred guide fin located just above one clamp head. By its shape it is so formed as to aid, in cooperation with the opening shaped to receive it, in achieving the forward sliding, downward cutting action.

When preferably one of the handles for a clamp head in the embodiment of FIGURES 20 and 21 has a short somewhat flexible strut affixed above the hinge to cooperate with the opposing handle and serve as a fulcrum, better control of the cutting action is achieved. The fulcrum engages the opposing handle when the instrument is barely closed and complete closing of the instrument is achieved by relatively heavy pressure in the closing motion, with the flexible fulcrum and the slight flexibility of the handles combining to permit the final closing and cutting action.

While by no means essential to the cryogenic clamp, the presence of opposing magnets as shown in FIGURE 20, whether above the hinge as is illustrated or below, greatly assists the operator in using the clamp in some situations. Ordinarily the magnets are positioned to attract one another and thus tend to close the instrument and hold it closed. This magnetic attraction to hold the clamp closed is particularly useful in those circumstances where the clamp must be kept closed around a blood vessel or the like for an extended period of time. In some circumstances however it may be desired to have the magnets oppose one another so that the operator closes the clamp against an opposing force, thereby achieving more delicate control of the cutting action. This repelling action, which is readily provided by reversing the poles of one of the magnets, also serves as a safety device to prevent premature closing of the clamp.

Except of course for the thermoelectric or Peltier effect cooling, all of the features illustrated in the drawings and described herein are useful with the embodiment of the clamp used for destroying tissue by direct contact with cooling fluid in the same manner as with the embodiment of the clamp having cooling means cooling the inner surface of the clamp. These features include variation in shape, as shown in FIGURES 5, 6 and 14 through 19 of the drawings, various blade combinations as shown in FIGURES 7 through 12, and the various features illustrated in FIGURES 2, and 20 through 24.

In the embodiment of the invention wherein the clamp head is cooled with a fluid the cooling fluid is circulated through the interior of the clamp head by a positive pressure. The particular cooling fluid employed is not ordinarily critical, except that it must be cold enough to achieve the degree of cooling or freezing desired. Any cooling liquid or gas which is sufficiently cold can be employed. The so-called "cryogenic fluids" are particularly suited for many applications. These include liquid argon, liquid fluorine, liquid helium, liquid hydrogen, liquid neon, liquid nitrogen, liquid oxygen and liquid methane. Other suitable fluids include liquid carbon dioxide. The gaseous or partially gaseous state of all of the above fluids may also be employed. Liquids which in the gaseous state are explosive, such as hydrogen, oxygen and methane, must be handled with extra care and under conditions which minimize the danger of explosion. If desired the cooling fluid, after being circulated through the clamp head, can be recompressed and recirculated rather than merely vented to the atmosphere or other wise disposed of.

In the embodiment of the invention wherein the clamp head is used to destroy tissue by impinging cooling fluid directly against the tissue, the cooling fluid is forced through the head and thence against the tissue by a positive pressure. Simple openings can be provided on the inner surface of the clamp head to permit the cooling fluid to pass through the clamp head and into contact with the tissue, or a porous material, such as a porous ceramic or metal, can be used for the inner surface of the clamp head to diffuse the fluid through. Hollow protrusions can be provided on the inner surface of the clamp head to assist in introducing the cooling fluid into certain types of tissue. The size of the holes or protrusions or the porosity of the inner surface are factors influencing the rate of freezing. Any non-toxic fluid which can be cooled sufficiently, including the cryogenic fluids listed above, can be used to freeze and destroy tissue with the clamp head having openings on its inner surface. Inasmuch as the fluid is vented to the atmosphere as it is released from the clamp head, however, the use of the explosive fluids such as hydrogen, oxygen and methane is not recommended.

In the embodiment of the invention wherein thermoelectric cooling, or Peltier effect cooling as it is also known, is employed, any suitable arrangement of Peltier cells may be employed for mounting on the clamp head. Thus a thermoelectric module consisting of 33 bismuth-telluride thermocouples might be employed. A source of direct current is connected to the module and the cold side of the module forms the interior surface of the clamp. If desired, a thermally conductive material can be used between the cold side of the module and the interior surface of the clamp. Fins on the hot side of the module are customarily used to dissipate heat evolved and they may be supplemented by a fan if desired. Clamps with cooling modules which dissipate the heat with fins are best suited for use outside the body, as for circumferentially cooling an arm or leg. Heat from the module may also be dissipated by circulating a cooling fluid such as water across the hot surface of the module. Though bulky, a clamp with a cooling module cooled in this manner might be employed inside the body in some circumstances.

The degree of cooling achieved in the clamp head used for cooling can be varied by varying the rate of flow of the cooling fluid through the head or by varying the flow of current to the thermoelectric cooling module. The degree of cold desired will of course vary with the purpose for which the cryogenic clamp is being employed. If complete blockage of a blood vessel is sought to achieve stasis and prevent the passage of malignant cells, for example, then the temperature will be lower than that required to merely reduce the flow of blood through a vessel. With tissue such as the mucous membrane stasis may achieved at a temperature between about 0° centigrade and minus 3° centigrade, while tissue such as muscle may require a temperature of minus 8° centigrade or lower. Such low temperatures can also be used to freeze a body organ which is to be thawed again, such as the tongue, whereas even lower temperatures are convenient when the organ is to be discarded, such as the appendix or tonsils. At temperatures much below minus 10° centigrade irreversible change usually occurs in the tissue morphology with destruction of the component cells. The length of time cooling fluid is circulated through the clamp head, or current applied to the module, as well as the time the clamp itself is in place are of course factors in the degree of cooling achieved. If desired thawing of the tissue can be accelerated by circulating a warming fluid through the clamp head or reversing the direction of flow of the current to the module.

When the clamp head is used to introduce cooling fluid into direct contact with tissue, the rate of flow of the cooling fluid as well as the size and type of the openings on the inner surface of the clamp head, together with the temperature of the fluid, determine the rate of freezing and hence the rate of destruction of tissue. While destructive freezing may start at minus 15 degrees centigrade or even higher, depending on the type of tissue, temperatures as low as minus 200 degrees centigrade or even lower may be employed.

It is recommended that the surgeon or person handling the clamp and removing frozen tissue wear insulated protective gloves. It may also be necessary to use insulating pads inside the body cavity to prevent the clamp and the area being frozen from sticking to other tissue, or cooling it undesirably.

It is to be understood that the scope of this invention is to be limited only by the claims following and is not restricted to the particular embodiments described herein. The scope of the invention includes any variations and modifications which may occur to those skilled in the art and which fall within the scope of the claims.

What is claimed is:

1. A clamp comprising a pair of elongated mutually hinged members extending in a common plane and containing a hinge, an activating handle integral with each elongated member, inter-engaging clamp halves integral with said elongated members, at least one of said clamp halves having means for circulating cooling fluid within the walls of said clamp half, and a magnet attached to each of said elongated members, at least one of said magnets being movable in said elongated member so that it may be so positioned that the magnets either attract or repel one another.

2. A clamp comprising a pair of elongated mutually hinged members extending in a common plane and containing a hinge, an activating handle integral with each elongated member, inter-engaging clamp halves integral with said elongated members and in upper and lower position to one another in use of the clamp, at least some of said clamp halves having means for circulating cooling fluid within the walls of said clamp half, said upper clamp half having a cutting edge directed toward said lower clamp half, a portion of the surface of the elongated member immediately adjacent to said upper clamp half being raised and a portion of the surface of the elongated member immediately adjacent to said lower clamp half being so shaped as to cooperate with said raised portion to cause said upper clamp half and cutting edge to move forward, then down and then forward again as the clamp is closed.

3. A clamp comprising two halves in hinged relationship to one another, said halves being capable of being separated and of being closed to enclose viable tissue, at least one of said halves having means for circulating cooling fluid through at least one perforated protrusion on the interior surface wall of said clamp half into the interior of said clamp.

4. A clamp comprising two halves in hinged relationship to one another, said halves being capable of being separated and of being closed to enclose viable tissue, at least one of said clamp halves having means for circulating cooling fluid through a porous interior surface wall of said clamp into the interior of said clamp.

5. A clamp comprising two halves in hinged relationship to one another, said halves being capable of being separated and of being closed to enclose viable tissue, at least one of said clamp halves having means for circulating cooling fluid through the interior surface wall of said clamp half into the interior of said clamp, and at least one of said halves having at least one cutting edge.

6. A cryogenic clamp comprising opposed mating clamp portions which together define the shape of a part composed of viable tissue to be clamped, a clamp portion manipulating member attached to each clamp portion and extending away therefrom, said clamp portion manipulating members being articulated to each other at a point spaced from said clamp portions, at least one of said clamp portions having a substantially uniform diameter unbranched conduit extending therethrough in a path extending in a substantially uniform pattern with respect to the interior surface of the clamp portion for distributing heat exchange fluid over the interior surface of said clamp portion and being spaced from the said interior surface a distance for substantially uniformly cooling the interior surface of the clamp portion, the space between the portions of said conduit in said pattern and between said conduit and said interior surface being filled with a good heat conducting material, and insulated heat exchange fluid supply and exhaust conduits connected to the opposite ends of the conduit in said one clamp portion for supplying and exhausting heat exchange fluid from each clamp portion, whereby the clamp can be placed around a part composed of viable tissue by manipulating the clamp portion from a point spaced therefrom and with a minimum disturbance to the tissue, and cryogenic cooling fluid can be supplied to the individual clamp portions to substantially uniformly cool the internal surfaces of the clamp portions.

7. A cryogenic clamp as claimed in claim 6 in which each clamp portion has said conduit extending therethrough.

8. A cryogenic clamp as claimed in claim 6 in which said opposed mating clamp portions together define a hollow cylinder open at both ends.

9. A cryogenic clamp as claimed in claim 6 in which said opposed mating clamp portions together define a hollow cylinder open at one end and closed at the other end.

References Cited

UNITED STATES PATENTS

| | | | |
|---|---|---|---|
| 437,877 | 10/1890 | Traux | 128—346 |
| 865,551 | 9/1907 | Wells | 128—305 |
| 1,079,128 | 11/1913 | Howe | 128—305 |
| 1,765,319 | 7/1930 | Williams | 128—346 |
| 2,825,338 | 3/1958 | Schnepf et al. | 128—402 |
| 2,888,927 | 6/1959 | Fozard | 128—303.13 |
| 3,091,242 | 5/1963 | Johnson et al. | 128—402 |
| 3,143,114 | 8/1964 | McCarthy et al. | 128—303 |

RICHARD A. GAUDET, *Primary Examiner.*

ROBERT E. MORGAN, *Examiner.*

G. McNEILL, *Assistant Examiner.*